United States Patent
Okushima et al.

(10) Patent No.: US 9,704,076 B2
(45) Date of Patent: Jul. 11, 2017

(54) ROTARY ENCODER CORRECTING METHOD FOR A TRANSPORT APPARATUS, AND A TRANSPORT APPARATUS USING SAME

(71) Applicant: SCREEN Holdings Co., Ltd., Kyoto (JP)

(72) Inventors: Tomoyasu Okushima, Kyoto (JP); Yoshitomo Wada, Kyoto (JP); Osamu Morizono, Kyoto (JP)

(73) Assignee: SCREEN HOLDINGS CO., LTD., Kyoto (JP)

( * ) Notice: Subject to any disclaimer, the term of this patent is extended or adjusted under 35 U.S.C. 154(b) by 0 days.

(21) Appl. No.: 15/214,039

(22) Filed: Jul. 19, 2016

(65) Prior Publication Data

US 2017/0032229 A1  Feb. 2, 2017

(30) Foreign Application Priority Data

Jul. 28, 2015  (JP) ................ 2015-148718

(51) Int. Cl.
| | |
|---|---|
| *G06K 15/10* | (2006.01) |
| *G01D 5/347* | (2006.01) |
| *B41J 11/42* | (2006.01) |
| *B65H 7/02* | (2006.01) |
| *G06K 15/00* | (2006.01) |

(52) U.S. Cl.
CPC ........... *G06K 15/4025* (2013.01); *B41J 11/42* (2013.01); *B65H 7/02* (2013.01); *G01D 5/34738* (2013.01); *G06K 15/102* (2013.01); *B65H 2553/51* (2013.01)

(58) Field of Classification Search
CPC ................ G01D 5/34738; B65H 2553/51
See application file for complete search history.

(56) References Cited

U.S. PATENT DOCUMENTS

| | | | | |
|---|---|---|---|---|
| 2005/0099153 A1* | 5/2005 | Komatsu | ................ | H02P 6/15 318/807 |
| 2006/0170723 A1* | 8/2006 | Thiessen | .............. | H04N 1/0473 347/16 |

(Continued)

FOREIGN PATENT DOCUMENTS

| | | | |
|---|---|---|---|
| JP | 2000047547 A | * | 2/2000 |
| JP | 2008-126516 A | | 6/2008 |

*Primary Examiner* — Shelby Fidler
(74) *Attorney, Agent, or Firm* — McDermott Will & Emery LLP (57) ABSTRACT

A rotary encoder correcting method for a transport apparatus having a rotary encoder for outputting output signals in response to rotation of a transport roller. The method includes the steps of setting beforehand the number of n-divided output signals obtained by dividing, by n, the number of output signals outputted from the rotary encoder with one rotation of the transport roller; measuring a divided area shift time for each divided area when a printing medium is transported at constant speed and each time the number of output signals agrees with the number of n-divided output signals; and calculating a correction coefficient for each divided area based on the divided area shift time. The divided area shift time is corrected for each divided area of the rotary encoder based on each correction coefficient when a process is carried out on the printing medium.

20 Claims, 6 Drawing Sheets

(56) References Cited

U.S. PATENT DOCUMENTS

2007/0206040 A1* 9/2007 Furuya ................. B41J 2/04573
                                                        347/15
2015/0277394 A1* 10/2015 Iesaki ...................... B65H 7/20
                                                        271/265.01

* cited by examiner

ROTARY ENCODER CORRECTING METHOD FOR A TRANSPORT APPARATUS, AND A TRANSPORT APPARATUS USING SAME

CROSS-REFERENCE TO RELATED APPLICATIONS

This application claims priority to Japanese Patent Application No. 2015-148718 filed Jul. 28, 2015. The entire contents of which are hereby incorporated herein by reference in entirety.

BACKGROUND OF THE INVENTION (1) Field of the Invention

This invention relates to a rotary encoder correcting method for a transport apparatus which calculates transport speeds of a printing medium and timing of processes based on output signals of a rotary encoder connected to a transport roller rotatable synchronously with movement of the printing medium, and to a transport apparatus using this method.

(2) Description of the Related Art

A known method of this type is used with a transport apparatus which transports elongate roll paper. The apparatus includes a transport roller rotatable synchronously with movement of the roll paper, and a rotary encoder having a shaft thereof connected to the center of the transport roller. The method measures transport speed of the roll paper based on output signals of the rotary encoder (see Japanese Unexamined Patent Publication No. 2008-126516, for example). A printing apparatus having the above transport apparatus, for example, performs printing while adjusting timing of printing based on the transport speed calculated.

However, the conventional example with such construction has the following problem.

The conventional method sometimes fails to connect the shaft of the rotary encoder in precise alignment to the center of the rotary shaft of the transport roller. When the transport roller is misaligned in this way, there arises a problem of being unable to accurately determine timing such as transport speed based on the output signals of the rotary encoder.

That is, with the shaft of the rotary encoder attached accurately, instead of being misaligned, to the center of the rotary shaft of the transport roller, when the entire outer circumferential surface of the transport roller is divided at given predetermined angles about the shaft of the rotary encoder, the same length of the outer circumferential surface of the transport roller is obtained for all angular divisions. Thus, a length of the outer circumferential surface of the transport roller corresponding to a moving distance of the roll paper, and the number of output signals of the rotary encoder, are in a one-to-one relationship. It is therefore possible to calculate a transport speed of the roll paper accurately based on the number of the output signals of the rotary encoder and periods of time taken until the output signals are outputted. In the case of misalignment, on the other hand, since the length of the outer circumferential surface of the transport roller varies from angle to angle, a length of the outer circumferential surface of the transport roller corresponding to a moving distance of the roll paper and the number of output signals of the rotary encoder are not in a one-to-one relationship. It is therefore impossible to calculate a transport speed of the roll paper accurately based on the number of the output signals of the rotary encoder and periods of time taken until the output signals are outputted. That is, accurate timing cannot be calculated based on the output signals of the rotary encoder.

SUMMARY OF THE INVENTION

This invention has been made having regard to the state of the art noted above, and its object is to provide a rotary encoder correcting method for a transport apparatus, which even with misalignment can calculate timing by making correction according to a degree of misalignment, and a transport apparatus using this method.

The above object is fulfilled, according to this invention, by a rotary encoder correcting method for a transport apparatus having a transport roller disposed on a transport path for transporting a printing medium and rotatable synchronously with transportation of the printing medium, and a rotary encoder with a shaft thereof connected to the transport roller for outputting output signals in response to rotation of the transport roller, the method comprising the steps of setting beforehand the number of n-divided output signals obtained by dividing, by n (n being an integer 2 or more), the number of output signals outputted from the rotary encoder with one rotation of the transport roller; measuring a time taken to output the number of n-divided output signals as a divided area shift time for each divided area when the printing medium is transported at constant speed and each time the number of output signals of the rotary encoder agrees with the number of n-divided output signals; and calculating a correction coefficient for each divided area based on the divided area shift time; wherein the divided area shift time is corrected for each divided area of the rotary encoder based on each correction coefficient when the printing medium is transported along the transport path and a process is carried out on the printing medium.

According to this invention, when the printing medium is transported at constant speed on the transport path, each time the number of output signals of the rotary encoder agrees with the number of n-divided output signals, a time taken to output the number of n-divided output signals is measured as a divided area shift time for each divided area (measuring step). And a correction coefficient for each divided area is calculated based on the divided area shift time (calculating step). The divided area shift time becomes long for a divided area having a peripheral length elongated by misalignment. The divided area shift time becomes short for a divided area having a peripheral length shortened by misalignment. It is therefore possible to obtain a correction coefficient for each divided area according to the degree of misalignment of the shaft of the rotary encoder relative to the center of the transport roller. When transporting the printing medium along the transport path and carrying out a process on the printing medium, since the divided area shift time is corrected for each divided area of the rotary encoder based on each correction coefficient, timing based on the output signals of the rotary encoder can be calculated accurately.

In this invention, when the transport path includes an inkjet head for discharging ink droplets to and printing on the printing medium, discharge timing of the inkjet head may be corrected based on the divided area shift time corrected.

Since the discharge timing can be corrected accurately, printing quality can be improved.

In this invention, using an average value of all the divided area shift times as reference divided area shift time, the correction coefficient may be calculated by a percentage of the divided area shift time to the reference divided area shift time.

Since the average value of all the divided area shift times when there is misalignment is equal to one divided area shift time when there is no misalignment, a correction coefficient according to the degree of misalignment can be calculated by using the average value as reference divided area shift time.

In this invention, the measuring step may be executed continually while the printing medium is transported; and the calculating step may be executed at predetermined times to update the correction coefficient.

Although errors are included in the measured divided area shift times, these errors can be inhibited by continuing measurement while the printing medium is transported. This can improve the accuracy of the correction coefficients and the accuracy of correcting transport speed.

In this invention, when the transport path includes a post-processing device downstream thereof for processing the printing medium, processing timing of the post-processing device may be corrected based on the transport speed corrected.

Since the processing timing can be corrected accurately, the processing accuracy of the post-processing device can be improved.

In another aspect of this invention, there is provided a transport apparatus having a transport roller disposed on a transport path for transporting a printing medium and rotatable synchronously with transportation of the printing medium, and a rotary encoder with a shaft thereof connected to the transport roller for outputting output signals in response to rotation of the transport roller, the apparatus comprising a parameter storage unit for storing beforehand the number of n-divided output signals obtained by dividing, by n (n being an integer 2 or more), the number of output signals outputted from the rotary encoder with one rotation of the transport roller; a storage unit for storing a time taken to output the number of n-divided output signals as a divided area shift time for each divided area when the printing medium is transported at constant speed and each time the number of output signals of the rotary encoder agrees with the number of n-divided output signals; and a correction coefficient calculating unit for calculating a correction coefficient for each divided area based on the divided area shift time; wherein a controller, which causes the printing medium to be transported along the transport path and carries out a process on the printing medium, corrects the divided area shift time for each divided area of the rotary encoder based on each correction coefficient.

According to this invention, when the printing medium is transported at constant speed on the transport path, each time the number of output signals of the rotary encoder agrees with the number of n-divided output signals stored in the parameter storage unit, a time taken to output the number of n-divided output signals is measured and stored in the storage unit as a divided area shift time for each divided area. And the correction coefficient calculating unit calculates a correction coefficient for each divided area based on the divided area shift time stored in the storage unit. The divided area shift time becomes long for a divided area having a peripheral length elongated by misalignment. The divided area shift time becomes short for a divided area having a peripheral length shortened by misalignment. It is therefore possible to obtain a correction coefficient for each divided area according to the degree of misalignment of the shaft of the rotary encoder relative to the center of the transport roller. The controller, which causes the printing medium to be transported along the transport path and carries out a process on the printing medium, corrects the divided area shift time for each divided area of the rotary encoder based on each correction coefficient. Thus, timing based on the output signals of the rotary encoder can be calculated accurately.

BRIEF DESCRIPTION OF THE DRAWINGS

For the purpose of illustrating the invention, there are shown in the drawings several forms which are presently preferred, it being understood, however, that the invention is not limited to the precise arrangement and instrumentalities shown.

DESCRIPTION OF THE PREFERRED EMBODIMENTS

A preferred embodiment of this invention will be described in detail hereinafter with reference to the drawings.

Figure 1:
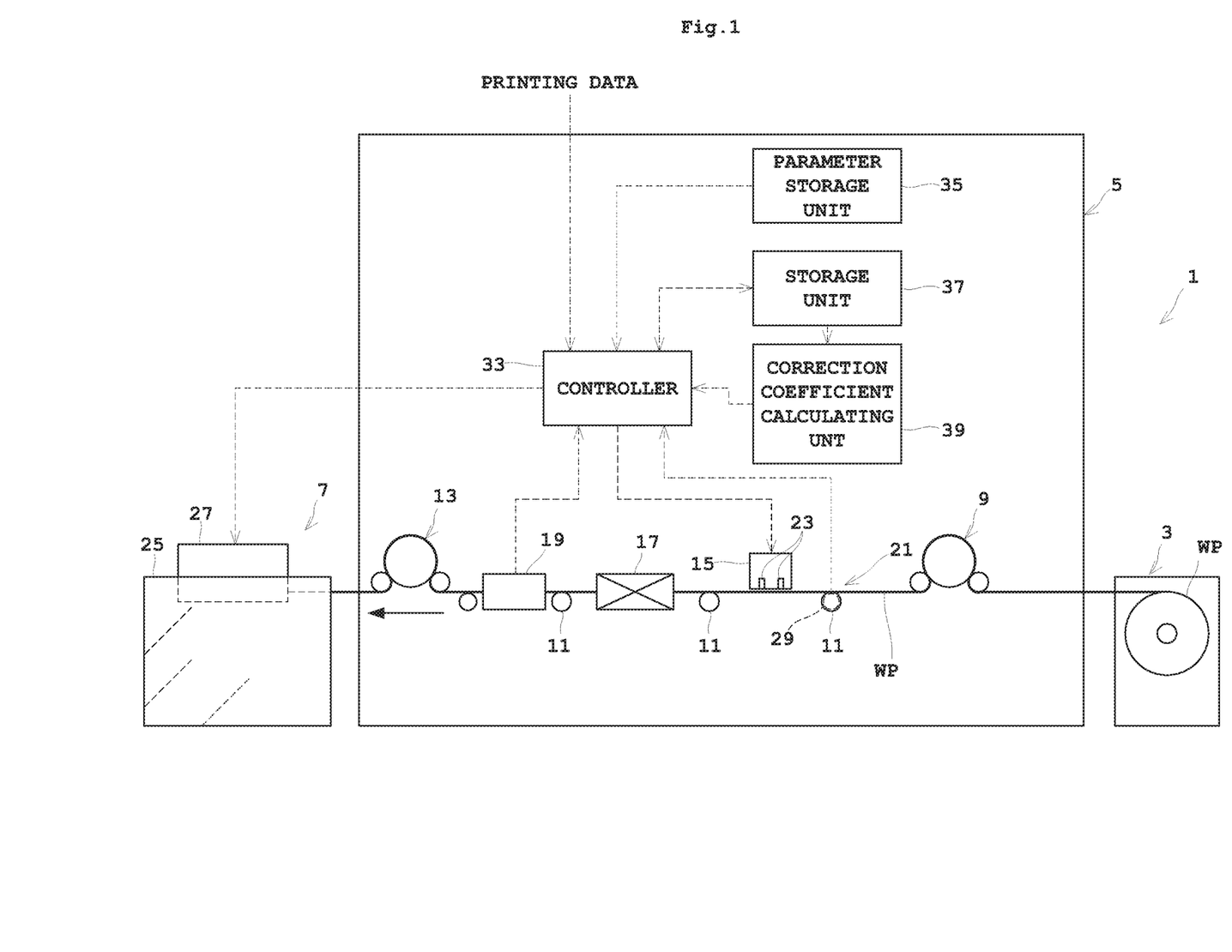
FIG. 1 is a schematic view showing an entire inkjet printing system having a transport apparatus according to this invention.
Figure 2:
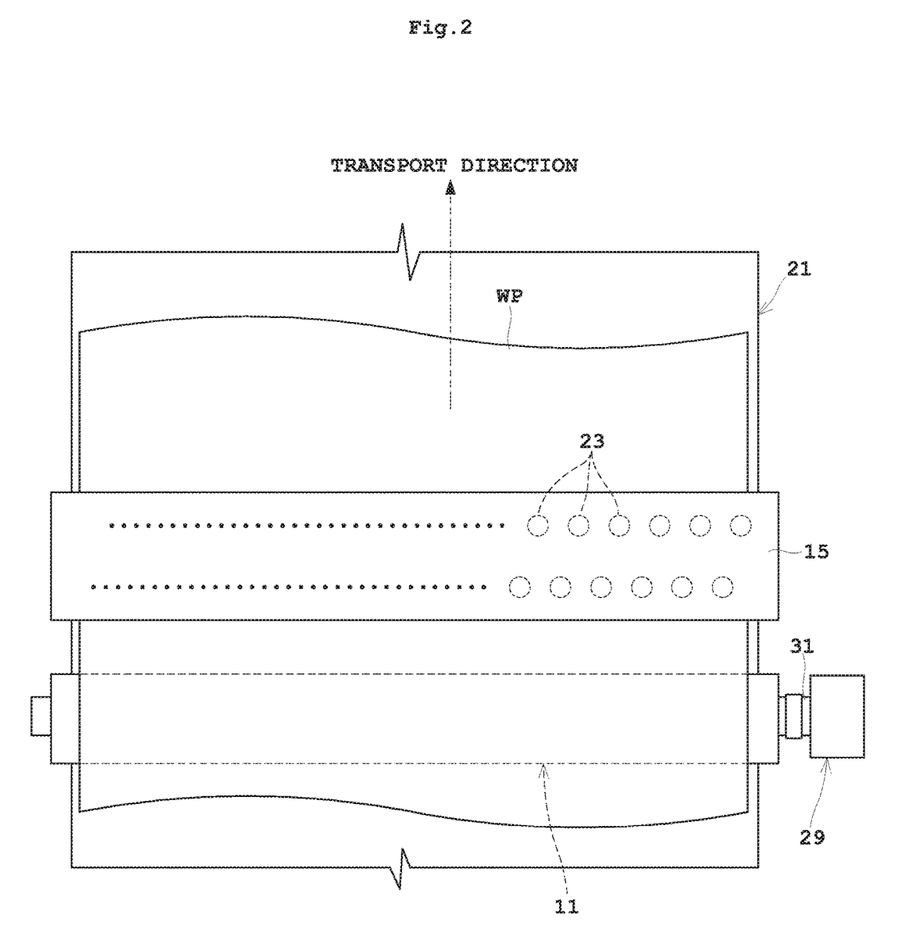
FIG. 2 is a plan view showing an inkjet head and adjacent components.

FIG. 1 is a schematic view showing an entire inkjet printing system having a transport apparatus according to this invention. FIG. 2 is a plan view showing an inkjet head and adjacent components;

An inkjet printing system 1 includes a paper feeder 3, an inkjet printing apparatus 5 and a takeup roller 7.

The paper feeder 3 holds web paper WP in a roll form and having a continuous printing area to be rotatable about a horizontal axis, and feeds the web paper WP to the inkjet printing apparatus 5. The inkjet printing apparatus 5 prints various images on the web paper WP fed thereto. The takeup roller 7 takes in the web paper WP printed, and carries out a post-processing for cutting the web paper WP into separate pages, and stores the cut pages as sorted by jobs.

The web paper WP noted above corresponds to the "printing medium" in this invention. The takeup roller 7 corresponds to the "post-processing device" in this invention.

The inkjet printing apparatus 5 prints on the web paper WP by discharging ink droplets thereto. The inkjet printing apparatus 5 includes a drive roller 9 for taking in the web paper WP from the paper feeder 3. The web paper WP unwound from the paper feeder 3 by the drive roller 9 is transported downstream toward the takeup roller 7 along a plurality of transport rollers 11. A drive roller 13 is disposed between the most downstream transport roller 11 and the takeup roller 7. This drive roller 13 feeds the web paper WP transported on the transport rollers 11 toward the takeup roller 7.

Between the drive roller 9 and drive roller 13, the inkjet printing apparatus 5 has an inkjet head 15, a drying unit 17, and an inspecting unit 19 arranged in the stated order. The drive roller 9, transport rollers 11 and drive roller 13 form a transport path 21 along which the web paper WP is transported. The inkjet head 13 has a plurality of discharge openings 23 formed in a lower surface thereof for discharging ink droplets. The drying unit 17 carries out a process for drying portions of the web paper WP printed by the inkjet head 15. The inspecting unit 19 carries out a process for inspecting printed areas of the web paper WP for any stains or omissions, and reading adjustment charts used for adjusting printing.

It is general practice to provide a plurality of inkjet heads 15 arranged along the transport direction of the web paper WP. For example, four inkjet heads 15 are provided separately for black (K), cyan (C), magenta (M), and yellow (Y). However, in order to facilitate understanding of the invention, the following description will be made on an assumption that only one inkjet head 15 is provided. The inkjet head 15 has an enough length to print over the entire width of the web paper WP without moving transversely of the web paper WP (in the depth direction on the plane of FIG. 1 and right and left directions in FIG. 2). That is, the inkjet printing apparatus 5 in this embodiment has the inkjet head 15 which does not move in a main scanning direction perpendicular to the transport direction of the web paper WP, but remains stationary to print on the web paper WP while the latter is transported in the transport direction.

The takeup roller 7 includes an intake and storage unit 25 and a cutter unit 27. The intake and storage unit 25 takes in the web paper WP fed in by the drive roller 13, and stores cut pages as sorted by jobs. The cutter unit 27 cuts the web paper WP into separate pages.

Of the plurality of transport rollers 11 noted above, the transport roller 11 disposed upstream of the inkjet head 15 has a rotary encoder 29 attached to one of opposite ends thereof. Specifically, the rotary encoder 29 has a shaft 31 thereof connected to the center of the transport roller 11. The rotary encoder 29 has the shaft 31 thereof rotatable with the transport roller 11 which is rotatable synchronously with movement of the web paper WP transported, and outputs output signals (pulse signals) in response to rotation of the shaft 31. The following description will be made on an assumption that the rotary encoder 29 is the incremental type which outputs two types of output signals, Z phase and AB phase.

The inkjet printing apparatus 5 includes a controller 33, a parameter storage unit 35, a storage unit 37 and a correction coefficient calculating unit 39. The controller 33 has a CPU and a timer/counter not shown. The controller 33 receives printing data from a host computer not shown, and carries out a printing process and a post-processing of the web paper WP while performing overall control of the drive rollers 9 and 13, drying unit 17, inspecting unit 19, intake and storage unit 25 and cutter unit 27. The rotary encoder 29 constantly outputs the output signals to the controller 33.

The parameter storage unit 35 stores the number of n-divided output signals obtained beforehand by dividing by n (here, n being an integer 2 or more) the number of output signals outputted from the rotary encoder 29 with one rotation of the transport roller 11. This number of n-divided output signals can also be set by the user through an operation panel not shown. However, this number of n-divided output signals is a value used for calculating the transport speed of the web paper WP, and there exists an appropriate value because of the apparatus design, which value does not change frequently. It is therefore desirable to set the above number beforehand by considering the design value at the time of manufacturing the apparatus. Where, for example, 8000 output signals are outputted with one rotation of the shaft 31 of the rotary encoder 29 and n=8, the number of n-divided output signals will become 1000. Note that the number of divisions n may be set instead of the number of n-divided output signals. In this case, the controller 33 carries out an operation for dividing the number of output signals per rotation of the rotary encoder 29 by the number of divisions n, and stores the number of n-divided output signals in the parameter storage unit 35.

The controller 33 determines, by referring to the number of n-divided output signals in the parameter storage unit 35, whether the number of output signals of the rotary encoder 29 is in agreement with the number of n-divided output signals. And the controller 33 checks a time taken for the number of output signals of the rotary encoder 29 to correspond to the number of n-divided output signals for each divided area, and stores it in the storage unit 37 as divided area shift time for each divided area. Preferably, the storage of this divided area shift time is carried out as a measuring process before printing a product, and also in parallel with printing at the time of printing the product.

The correction coefficient calculating unit 39 calculates a correction coefficient for each divided area based on the divided area shift time for each divided area stored in the storage unit 37. This calculation is carried out using percentage of the divided area shift time to obtain an average value of all the divided area shift times occurring with one rotation of the transport roller 11 as a reference divided area shift time. Each correction coefficient obtained is given to the controller 33.

Figure 3:
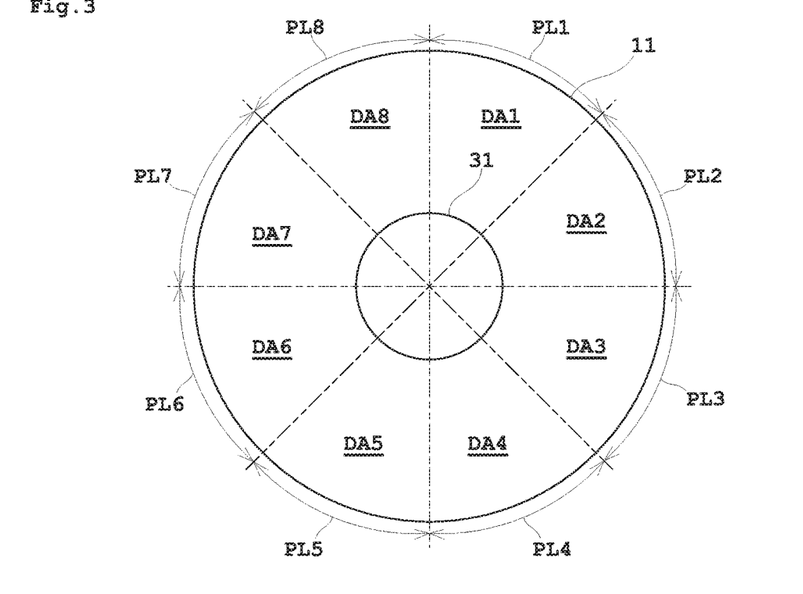
FIG. 3 is a schematic view showing a positional relationship between a transport roller and a rotary encoder in alignment.
Figure 4:
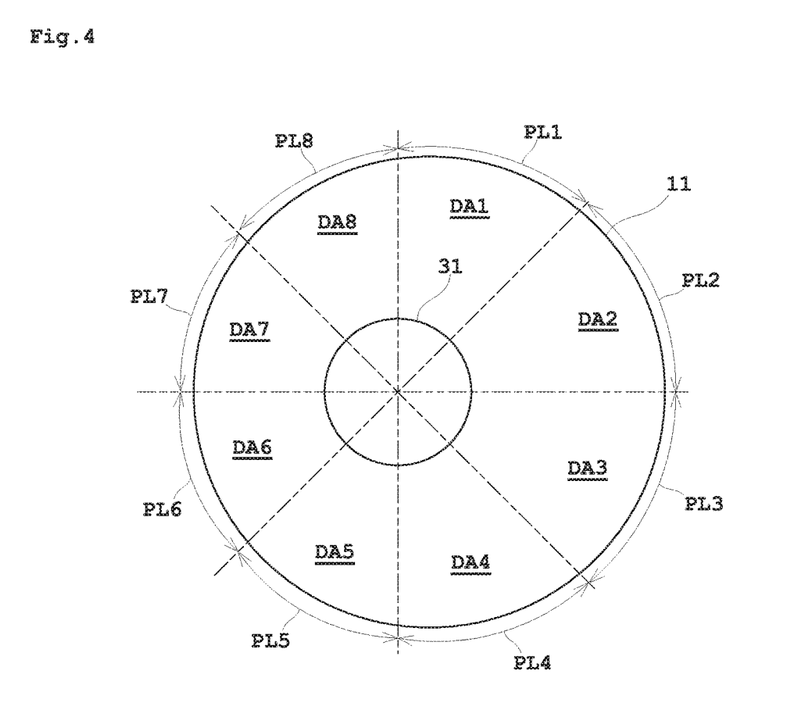
FIG. 4 is a schematic view showing a positional relationship between the transport roller and the rotary encoder out of alignment.

Next, reference is made to FIGS. 3 and 4. FIG. 3 is a schematic view showing a positional relationship between the transport roller and the rotary encoder in alignment. FIG. 4 is a schematic view showing a positional relationship between the transport roller and the rotary encoder out of alignment.

With the transport roller 11 and the shaft 31 of the rotary encoder 29 connected to be accurately concentric with each other instead of being out of alignment, as shown in FIG. 3, eight divided areas DA1-DA8 are formed when the number of divisions n=8 and the entire outer circumferential surface of the transport roller 11 is divided at equal angular intervals about the shaft 31. All of these eight divided areas DA1-DA8 have equal peripheral lengths PL1-PL8 on the outer circumferential surface of the transport roller 11. In this case, the divided area shift times for all of the divided areas DA1-DA8 of the rotary encoder 29 become equal when the web paper WP is transported at constant speed. Therefore, the transport speed of the web paper WP can be calculated accurately by measuring the divided area shift times.

With the transport roller 11 and the shaft 31 of the rotary encoder 29 being out of alignment, on the other hand, as shown in FIG. 4, when the number of division is set to n=8 as in FIG. 3, the eight divided areas DA1-DA8 have different peripheral lengths PL1-PL8 on the outer circumferential surface of the transport roller 11. Consequently, the divided area shift times for the divided areas DA1-DA8 of the rotary encoder 29 become different even when the web paper WP is transported at constant speed. Therefore, the transport speed of the web paper WP cannot be calculated accurately by measuring the divided area shift times.

So a measuring process is first carried out to obtain a correction coefficient for each of the divided areas DA1-DA8.

Figure 5:
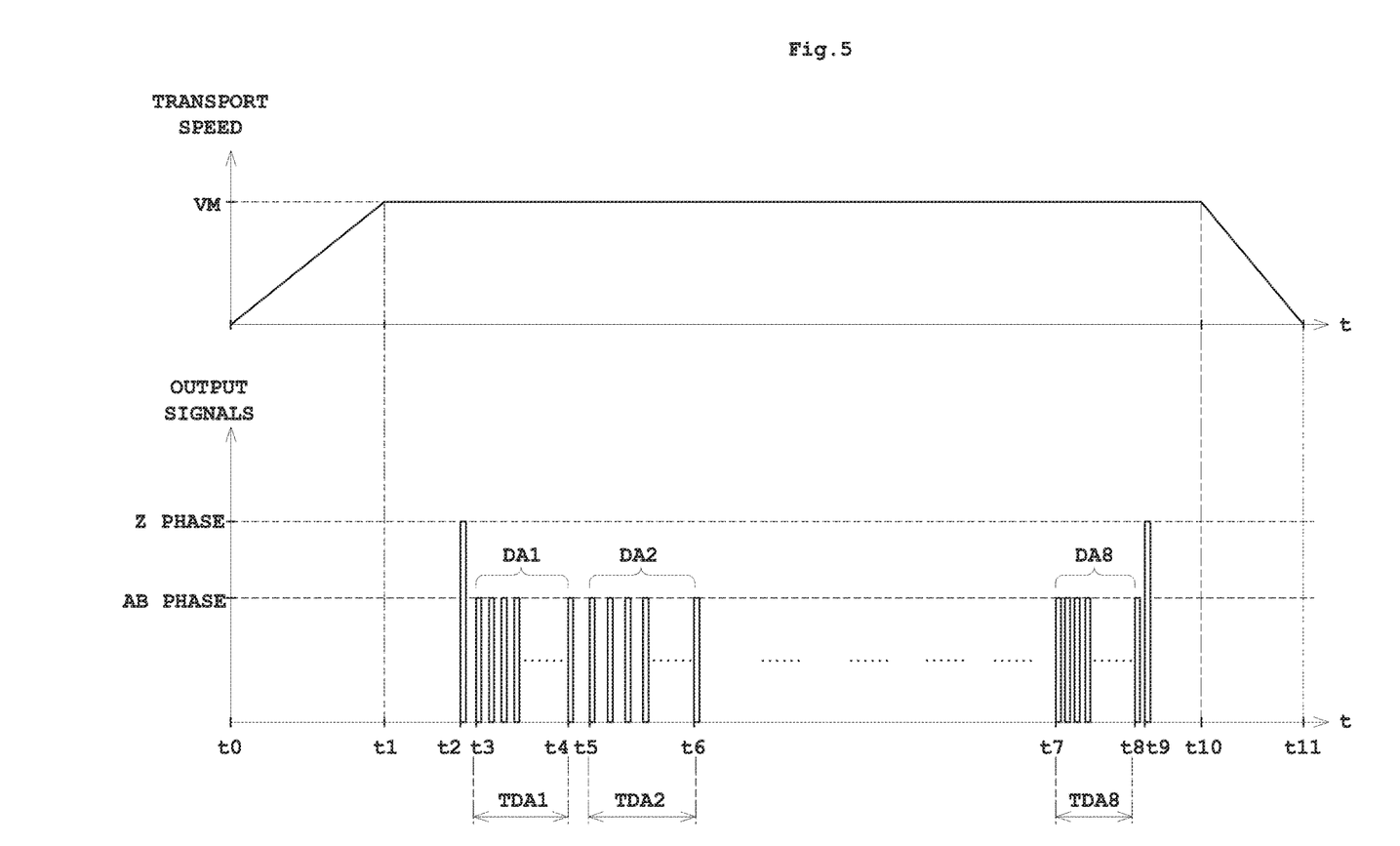
FIG. 5 is a time chart for illustrating measurement of divided area shift times.

The process for obtaining a correction coefficient will be described with reference to FIG. 5. FIG. 5 is a time chart for illustrating measurement of divided area shift times.

The controller 33 operates the drive rollers 9 and 13 to transport the web paper WP at constant speed, e.g. at measuring speed VM. Specifically, the transportation is started at time t0, the measuring speed VM is reached at time t1, this speed is maintained until time t10, and the transportation is stopped at time t11. After the transport speed reaches and stabilizes at the measuring speed VM, the controller 33, based on time t2 at which an output signal in Z phase is outputted, and of output signals in AB phase outputted thereafter, measures an output time of the number of n-divided output signals (e.g. 1000 output signals), and stores this time as a divided area shift time TDA1 in the storage unit 37. In this way, the controller 33 measures divided area shift times TDA1-TDA8 for all the divided areas DA1-DA8. After time t11 the controller 33 calculates a correction coefficient for each of the divided areas DA1-DA8 based on divided area shift times TDA1-TDA8 measured for all of the divided areas DA1-DA8. Specifically, this calculation is made by obtaining percentages of the divided area shift times TDA1-TDA8 with respect to the reference divided area shift time.

Figure 6:
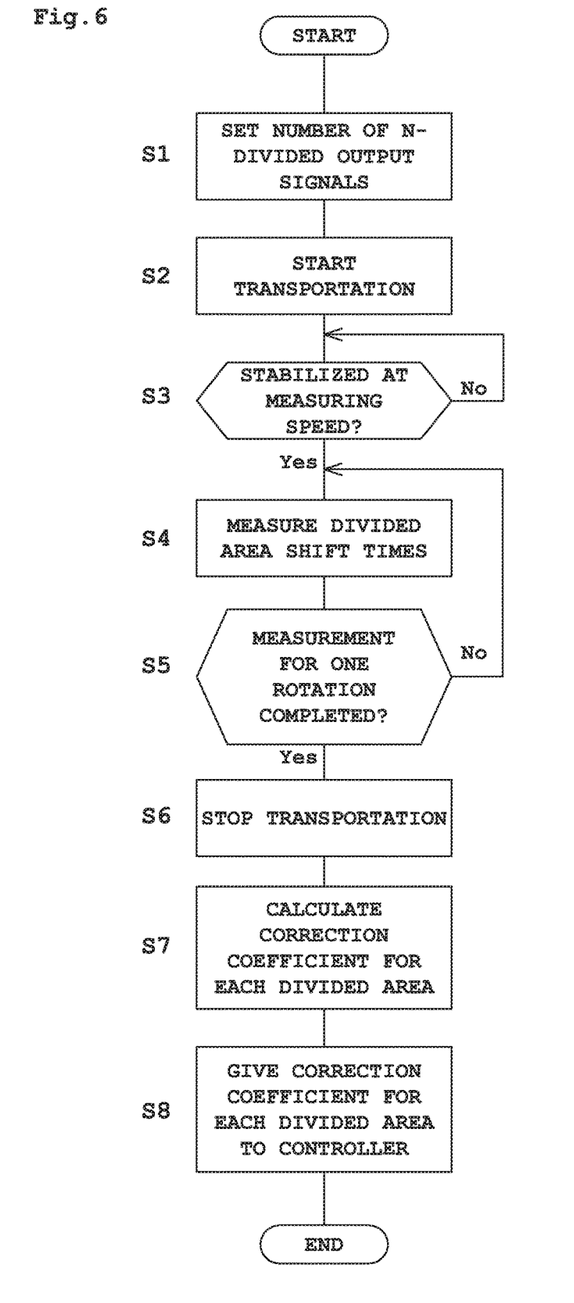
FIG. 6 is a flow chart showing a process of measuring the divided area shift time and a process of calculating a correction coefficient.

Next, the above measuring process will be described with reference to FIG. 6. FIG. 6 is a flow chart showing a process of measuring the divided area shift time and a process of calculating a correction coefficient.

Step S1

The number of n-divided output signals is set to the parameter storage unit 35. This may be set by inputting the number of divisions n and calculating the number of n-divided output signals.

Steps S2 and S3

Transportation of the web paper WP is started (at time t0 in FIG. 5), and measurement waits until transport speed stabilizes at the measuring speed VM (at time t1 in FIG. 5). Whether the speed has stabilized or not can be determined based on whether, of the output signals of the rotary encoder 29, intervals between the output signals in any one of the divided areas DA1-DA8 have stabilized or not.

Steps S4 and S5

The controller 33 measures divided area shift times TDA1-TDA8 for all the divided areas DA1-DA8 of the rotary encoder 29, respectively, as noted above (at times t3-t8 in FIG. 5). The measured divided area shift times TDA1-TDA8 are stored in the storage unit 37. Instead of measurement for one rotation, measurement may be made of divided area shift times TDA1-TDA8 for a plurality of rotations, and their average values may be used as divided area shift times TDA1-TDA8. Since this increases the accuracy of measurement of divided area shift times TDA1-TDA8, the accuracy of the correction coefficients is improved and the accuracy of measurement of transport speed can also improved.

Step S6

The controller 33 stops transporting the web paper WP upon completion of the measurement of the divided area shift times TDA1-TDA8 (at time t11 in FIG. 5).

Steps S7 and S8

The correction coefficient calculating unit 39 calculates a correction coefficient for each of the divided areas DA1-DA8 based on the divided area shift times TDA1-TDA8 stored in the storage unit 37. The correction coefficient calculated for each of the divided areas DA1-DA8 is given to the controller 33.

Step S4 and S5 described above correspond to the "measuring process" in this invention. Step S7 corresponds to the "calculating process."

Figure 7:
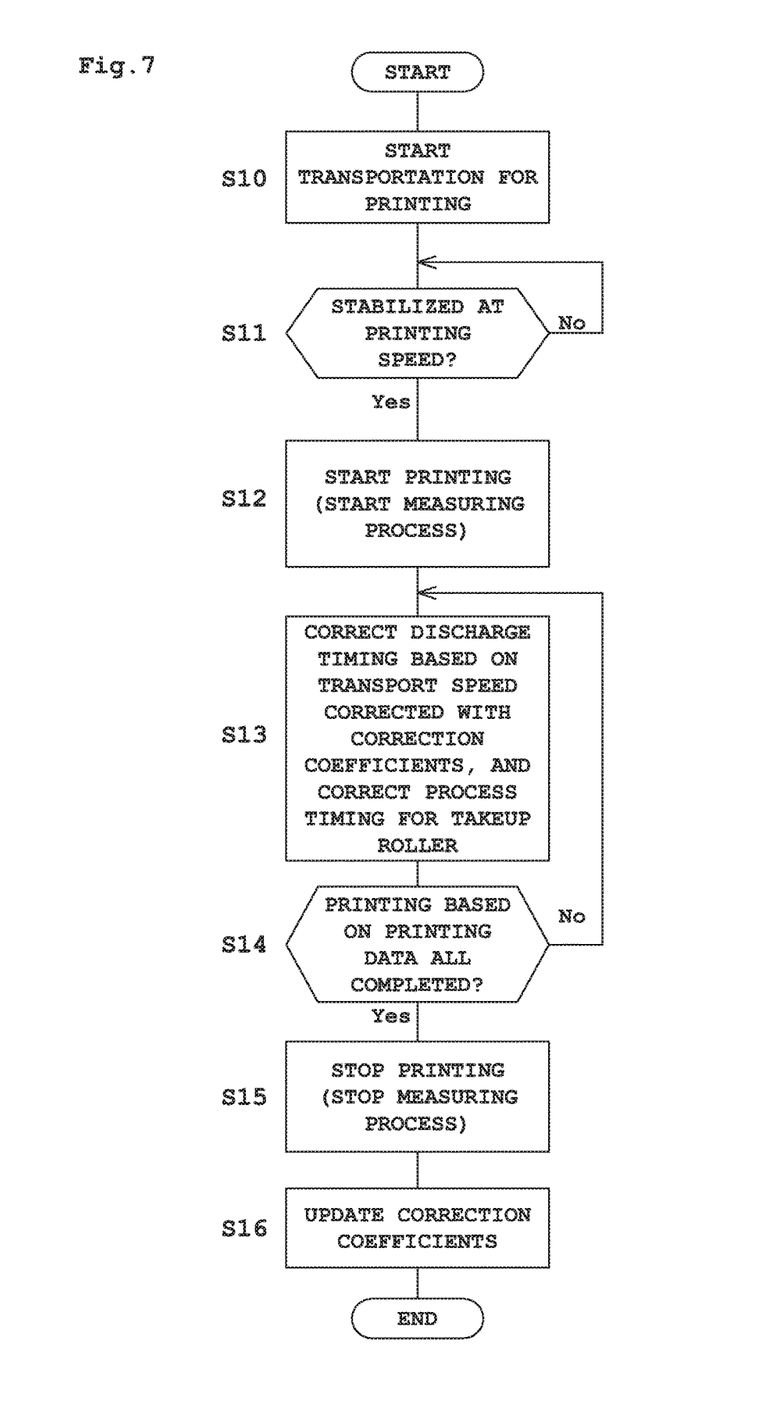
FIG. 7 is a flow chart showing a printing process.

Next, a process for printing on the web paper WP will be described with reference to FIG. 7. FIG. 7 is a flow chart showing a printing process.

Steps S10 and S11

The controller 33 operates the drive rollers 9 and 13 to start transporting the web paper WP at printing speed as target speed, and maintains transportation until it stabilizes at the printing speed.

Step S12

The controller 33 starts printing by discharging ink droplets from the inkjet head 15 based on printing data. It is preferable to carry out also the above measuring process in parallel at this time.

Step S13

The controller 33 corrects the transport speed with the correction coefficient for each of the divided areas DA1-DA8. Based on the corrected transport speed, the controller 33 adjusts the discharge timing of the inkjet head 15. In the case of a transport speed measured in the divided area DA2 where, for example, the peripheral length PL2 is longer than the peripheral length PL6 of divided area DA6, the corrected transport speed can be obtained by multiplying the measured transport speed by the correction coefficient (which is larger than 1 for divided area DA2, and smaller than 1 for divided area DA6). Further, the controller 33 adjusts timing of the cutting process by the cutter unit 27 based on the corrected transport speed.

Step S14

The controller 33 determines based on the printing data whether all the printing has been completed. When the printing process has been completed, the operation branches to step S15.

Step S15

The controller 33 operates the drive rollers 9 and 13 to stop transporting the web paper WP. With this, the measuring process is stopped.

Step S16

The controller 33 causes the correction coefficient calculating unit 39 to calculate a correction coefficient for each of the divided areas DA1-DA8 based on the divided area shift times TDA1-TDA8 repeatedly measured during the above printing process. And the correction coefficient for each of the divided areas DA1-DA8 held in the controller 33 is updated. Although errors are included in the measured divided area shift times TDA1-TDA8, these errors can be inhibited by continuing measurement while the web paper WP is transported. This can improve the accuracy of the correction coefficients and the accuracy of correcting the transport speed.

Steps S12-S14 described above correspond to the "measuring process" in this invention. Step S16 corresponds to the "calculating process."

According to this embodiment, when the web paper WP is transported at constant speed on the transport path 21, each time the number of output signals of the rotary encoder 29 agrees with the number of n-divided output signals stored in the parameter storage unit 35, a time taken to output the number of n-divided output signals is measured and stored in the storage unit 37 as a divided area shift time TDA1-TDA8 for each of the divided areas DA1-DA8. And the correction coefficient calculating unit 39 calculates a correction coefficient for each of the divided areas DA1-DA8 based on the divided area shift times TDA1-TDA8 stored in the storage unit 37. When transporting the web paper WP along the transport path 21 and carrying out a process on the web paper WP, since the transport speed of the web paper WP is corrected by correcting the divided area shift time TDA1-TDA8 for each of the divided areas DA1-DA8 of the rotary encoder 29 based on each correction coefficient, the transport speed can be calculated accurately even if misalignment has occurred. Consequently, printing quality can be improved since no influence of misalignment is exerted on printing. It is also possible to improve the accuracy of cutting process at the takeup roller 7.

This invention is not limited to the foregoing embodiment, but may be modified as follows:

(1) The foregoing embodiment has been described in which this invention is applied to the inkjet printing system 1. This invention is applicable also to other types of printing apparatus as long as they include a transport apparatus for transporting a printing medium.

(2) In the foregoing embodiment, corrected transport speed is used for correcting of discharge timing of the inkjet head 15, and for correcting timing of the cutting process at the takeup roller 7. However, the invention may use the corrected transport speed for correcting only one of the above, or may use it for correcting timing of other processes such as timing of inspection at the inspecting unit 19. The controller 33 may, without correcting transport speed, correct timing of pulses outputted from the rotary encoder 29 with correction coefficients, and in accordance with the corrected timing may correct discharge timing of the inkjet head 15 or timing of the cutting process at the takeup roller 7, (3) In the foregoing embodiment, the divided area shift times TDA1-TDA8 are measured not only during the measuring process but during the printing process. However, this invention does not require as indispensable the measuring process during the printing process.

(4) The foregoing embodiment has been described taking for example a construction in which the transport roller 11 with the rotary encoder 29 attached thereto is disposed upstream of the inkjet head 15. This invention is not limited to such construction. For example, the rotary encoder 29 may be attached to a transport roller 11 disposed between a plurality of inkjet heads 15.

This invention may be embodied in other specific forms without departing from the spirit or essential attributes thereof and, accordingly, reference should be made to the appended claims, rather than to the foregoing specification, as indicating the scope of the invention.

What is claimed is:

1. A rotary encoder correcting method for a transport apparatus having a transport roller disposed on a transport path for transporting a printing medium and rotatable synchronously with transportation of the printing medium, and a rotary encoder with a shaft thereof connected to the transport roller for outputting output signals in response to rotation of the transport roller, the method comprising the steps of:
    setting beforehand the number of n-divided output signals obtained by dividing, by n (n being an integer 2 or more), the number of output signals outputted from the rotary encoder with one rotation of the transport roller;
    measuring a time taken to output the number of n-divided output signals as a divided area shift time for each divided area when the printing medium is transported at constant speed and each time the number of output signals of the rotary encoder agrees with the number of n-divided output signals; and
    calculating a correction coefficient for each divided area based on the divided area shift time;
    wherein the divided area shift time is corrected for each divided area of the rotary encoder based on each correction coefficient when the printing medium is transported along the transport path and a process is carried out on the printing medium.

2. The rotary encoder correcting method for the transport apparatus according to claim 1, wherein, when the transport path includes an inkjet head for discharging ink droplets to and printing on the printing medium, discharge timing of the inkjet head is corrected based on the divided area shift time corrected.

3. The rotary encoder correcting method for the transport apparatus according to claim 1, wherein, using an average value of all the divided area shift times as reference divided area shift time, the correction coefficient is calculated by a percentage of the divided area shift time to the reference divided area shift time.

4. The rotary encoder correcting method for the transport apparatus according to claim 2, wherein, using an average value of all the divided area shift times as reference divided area shift time, the correction coefficient is calculated by a percentage of the divided area shift time to the reference divided area shift time.

5. The rotary encoder correcting method for the transport apparatus according to claim 1, wherein:
    the measuring step is executed continually while the printing medium is transported; and
    the calculating step is executed at predetermined times to update the correction coefficient.

6. The rotary encoder correcting method for the transport apparatus according to claim 2, wherein:
    the measuring step is executed continually while the printing medium is transported; and
    the calculating step is executed at predetermined times to update the correction coefficient.

7. The rotary encoder correcting method for the transport apparatus according to claim 3, wherein:
    the measuring step is executed continually while the printing medium is transported; and
    the calculating step is executed at predetermined times to update the correction coefficient.

8. The rotary encoder correcting method for the transport apparatus according to claim 4, wherein:
    the measuring step is executed continually while the printing medium is transported; and
    the calculating step is executed at predetermined times to update the correction coefficient.

9. The rotary encoder correcting method for the transport apparatus according to claim 1, wherein, when the transport path includes a post-processing device downstream thereof for processing the printing medium, processing timing of the post-processing device is corrected based on the transport speed corrected.

10. The rotary encoder correcting method for the transport apparatus according to claim 2, wherein, when the transport path includes a post-processing device downstream thereof for processing the printing medium, processing timing of the post-processing device is corrected based on the transport speed corrected.

11. The rotary encoder correcting method for the transport apparatus according to claim 3, wherein, when the transport path includes a post-processing device downstream thereof for processing the printing medium, processing timing of the post-processing device is corrected based on the transport speed corrected.

12. The rotary encoder correcting method for the transport apparatus according to claim 4, wherein, when the transport path includes a post-processing device downstream thereof for processing the printing medium, processing timing of the post-processing device is corrected based on the transport speed corrected.

13. The rotary encoder correcting method for the transport apparatus according to claim 5, wherein, when the transport path includes a post-processing device downstream thereof for processing the printing medium, processing timing of the post-processing device is corrected based on the transport speed corrected.

14. The rotary encoder correcting method for the transport apparatus according to claim 6, wherein, when the transport path includes a post-processing device downstream thereof for processing the printing medium, processing timing of the post-processing device is corrected based on the transport speed corrected.

15. The rotary encoder correcting method for the transport apparatus according to claim 7, wherein, when the transport path includes a post-processing device downstream thereof for processing the printing medium, processing timing of the post-processing device is corrected based on the transport speed corrected.

16. The rotary encoder correcting method for the transport apparatus according to claim 8, wherein, when the transport path includes a post-processing device downstream thereof for processing the printing medium, processing timing of the post-processing device is corrected based on the transport speed corrected.

17. A transport apparatus having a transport roller disposed on a transport path for transporting a printing medium and rotatable synchronously with transportation of the printing medium, and a rotary encoder with a shaft thereof connected to the transport roller for outputting output signals in response to rotation of the transport roller, the apparatus comprising:

a parameter storage unit for storing beforehand the number of n-divided output signals obtained by dividing, by n (n being an integer 2 or more), the number of output signals outputted from the rotary encoder with one rotation of the transport roller;

a storage unit for storing a time taken to output the number of n-divided output signals as a divided area shift time for each divided area when the printing medium is transported at constant speed and each time the number of output signals of the rotary encoder agrees with the number of n-divided output signals; and a correction coefficient calculating unit for calculating a correction coefficient for each divided area based on the divided area shift time;

wherein a controller, which causes the printing medium to be transported along the transport path and carries out a process on the printing medium, corrects the divided area shift time for each divided area of the rotary encoder based on each correction coefficient.

18. The transport apparatus according to claim 17, wherein:

the transport path includes an inkjet head for discharging ink droplets to and printing on the printing medium; and the controller is arranged to correct discharge timing of the inkjet head based on the divided area shift time corrected.

19. The transport apparatus according to claim 17, wherein the correction coefficient calculating unit is arranged to use an average value of all the divided area shift times as reference divided area shift time, and calculate the correction coefficient by a percentage of the divided area shift time to the reference divided area shift time.

20. The transport apparatus according to claim 18, wherein the correction coefficient calculating unit is arranged to use an average value of all the divided area shift times as reference divided area shift time, and calculate the correction coefficient by a percentage of the divided area shift time to the reference divided area shift time.

* * * * *